Nov. 24, 1925.

W. HUGHES

WRAPPING FOR STEERING WHEELS

Filed Dec. 10, 1924   2 Sheets-Sheet 1

1,563,191

Inventor
WALTER HUGHES
Attorney

Patented Nov. 24, 1925.

1,563,191

UNITED STATES PATENT OFFICE.

WALTER HUGHES, OF LOS ANGELES, CALIFORNIA.

WRAPPING FOR STEERING WHEELS.

Application filed December 10, 1924. Serial No. 755,093.

*To all whom it may concern:*

Be it known that I, WALTER HUGHES, a citizen of the United States of America, residing at Los Angeles, in the county of Los Angeles and State of California, have invented new and useful Improvements in Wrappings for Steering Wheels, of which the following is a specification.

It is the purpose of the present invention to provide, in connection with a steering wheel, an improved whipping and method for forming the same to provide a wrapping or covering for an automobile steering wheel rim, the further purposes and advantages being hereinafter set forth.

Heretofore, coverings in the form of a cord wrapping have been used upon rims of automobile steering wheels, but in these the cord is simply wound around the rim, especially in the form of a single strand, and while this form of covering provides means to insure a firm grip on the steering wheel, the moisture and perspiration which usually exists in the palm of the hand are not avoided. Furthermore, this form of covering tends to slip and also loosen due to the constant sliding of the operator's hand about the covering, especially in exerting a pull upon one side or the other of the wheel, which causes the cord to jamb in one direction or the other which, in the course of a short while, presents an untidy appearance.

Now, in connection with the present whipping and the method of constructing the same, these disadvantages are overcome in that a special method of whipping the covering on the rim of the wheel causes to be formed a continuous knot or beading or rib located centrally adjacent the outer portion of the rim of the wheel. This bead or rib not only insures a better and firmer grip of the hand on the wheel but also it fits in the palm of the hand in such a manner as to hold the surface of the palm of the hand away from the surface of the whipping, especially adjacent the sides of the bead or rib, hence providing air spaces to avoid the collection of moisture or perspiration.

As another purpose, the whipping involves the use of at least three strands, and each time each strand is passed about the rim of the wheel, a knot is formed constituting a unit of the rib or bead. In making each knot, that portion of the cord which is whipped about the rim of the wheel may be drawn tight, allowing the one who is applying the whipping to relax the tension or exertion on the cord, whereas in applying a whipping consisting of a single cord wound around the rim of the wheel without any knots, or with a single knot in a single strand to form a single bead, it is necessary to maintain a constant tension or pull upon the cord to avoid any loose parts in the whipping. It is practically impossible to use a single strand wound around the rim of the wheel, even with or without a partial knot, to avoid loose sections or portions in the wrapping.

The present improved whipping can be drawn extremely tight, each whipping being knotted and coacting with adjacent whippings to avoid the strands forming the whippings from loosening.

As still another purpose, the bead or rib acts as a reenforcement or abutment, preventing excessive distortion of the covering in the transverse direction of the rim due to the hand firmly gripping the surface of the covering.

A further purpose is to provide, in a covering for a steering wheel rim, one which is continuous and unbroken about the entirety of the rim of the steering wheel, each whipping of the covering cooperating with and abutting the adjacent whippings to prevent slipping of the covering, either annularly of the steering wheel rim or transversely thereof.

A still further purpose is to provide a suitable covering in the form of a Turk's head which overlies the ends of the strand forming the whipping, hence preventing constant contact of the hand with the ends of the whipping which would otherwise loosen the whipping forming the covering.

Obviously, as a further advantage, the Turk's head enables the steering wheel to be aligned for the purpose of holding the steering wheel straight ahead, thereby allowing the chauffeur or operator to more accurately back the automobile, as well as enabling the chauffeur or operator to know the position of the steering wheel and thereby facilitate the art of turning in either direction.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

Figure 1:
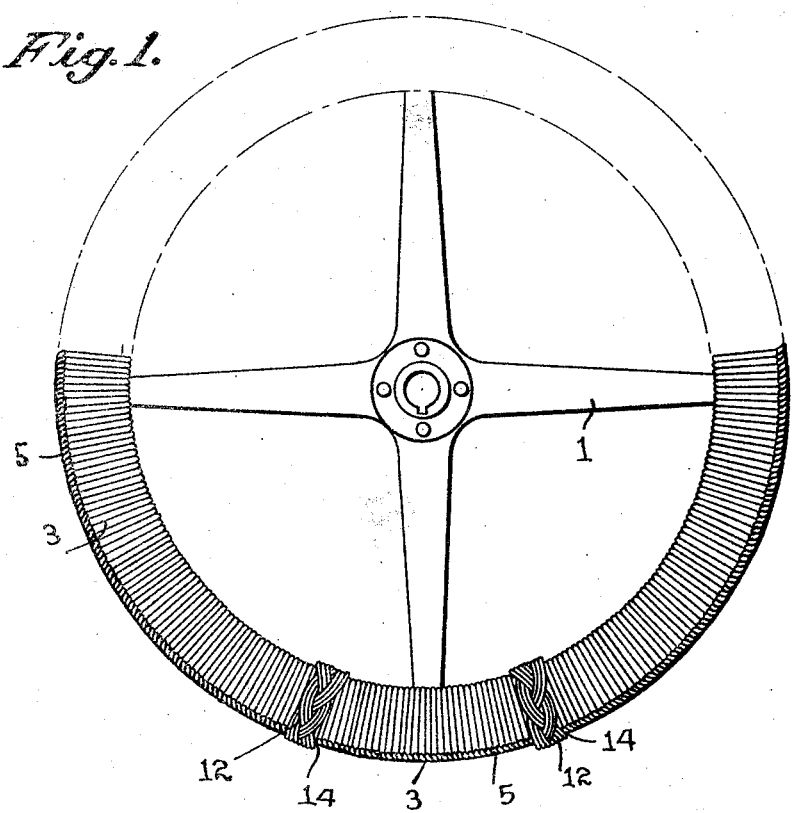
Figure 1 is a plan view of a steering wheel showing the improved covering in the form of whipping applied to the rim of the wheel.

Referring to the drawings, 1 designates the steering wheel as a whole and 2 denotes the rim thereof which is of the usual shape in cross sectional area, and applied to the rim is a covering 3 which enables the chauffeur or operator of an automobile to have a firm grip on the rim of the wheel in operating the same. This covering consists of a cord whipping, preferably common chalk-line cord, consisting of three strands and, for illustrative purposes to carry out the method of whipping, the strands of the cord are shown as being individually colored, in consecutive order, red, white and blue.

Figure 4:
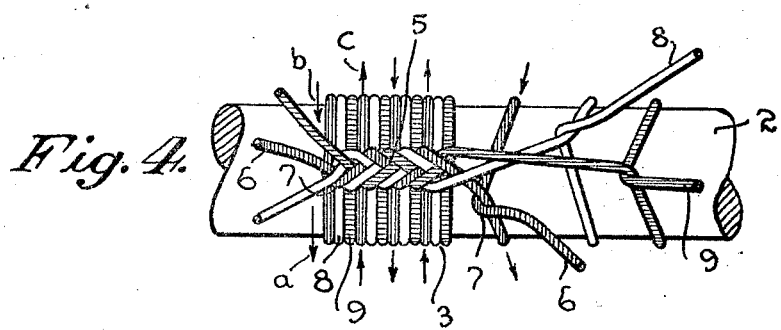
Figure 4 is a view of a fragmentary portion of the rim of the steering wheel, also showing a portion of whipping and illustrating the start and with several of the whippings thereof opened up to illustrate the method of whipping the rim of the wheel.

Referring to Figure 4, it will be noted that the red cord 6 passes in a direction transversely around the rim, as indicated by the arrow $a$, and approaches the rib or bead 5 at its opposite side and enters the rib or bead and forms a part thereof, the cord extending in the direction indicated by the arrow $b$. The red cord 6, in again forming a whipping around the rim of the wheel, leaves the rib or bead in the direction of the arrow $c$, just the opposite to the direction the same cord takes in being passed about the rim in the direction of the arrow $a$. The red cord 6, in again approaching the rib or bead and entering the same, passes under itself at 7 where the same cord extends from the rib or bead, so that the strand of red cord can be drawn tight.

In providing this arrangement and construction of the red cord 6 and in its passage transversely about the surface of the rim, it is spaced due to the intervening white and blue cords 8 and 9. The construction and arrangement of the white and blue cords are the same as that of the red cord. In fact, each strand of cord in passing transversely about the rim of the wheel first extends in one direction about the rim and in again passing about the rim it skips the two other strands or, in other words, has two intervening strands.

Obviously, in arranging the strands of cord in this manner, they can be drawn extremely tight due to the formation of the knots in the cord which make up the plurality of units forming the bead or rib. Adjacent each side of the rib or bead, especially when the palm of the hand is in gripping engagement with the rim of the wheel, air spaces are afforded, thereby preventing the palm of the hand from becoming moist due to perspiration which would otherwise occur in case the palm of the hand engaged throughout its entirety with the surface of the rim of the wheel.

Figure 3:
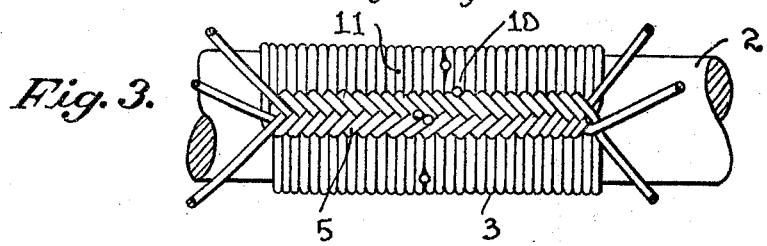
Figure 3 is a view of a fragmentary portion of the steering wheel rim, showing a section of whipping applied and illustrating the start and finish of the whipping.
Figure 5:
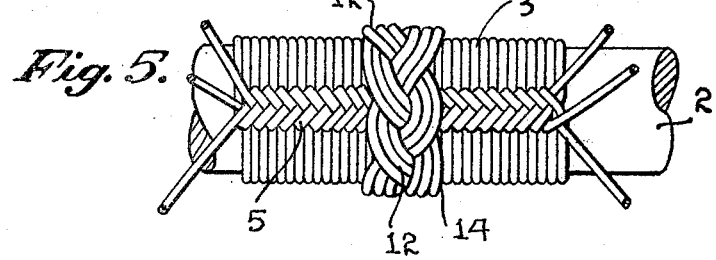
Figure 5 is a view of a fragmentary portion of the steering wheel with a portion of the whipping applied and illustrating a Turk's head applied about the whipping and overlying the terminal portions of the whipping.

Referring to Figure 3, the numerals 10 and 11 designate the start and finish of the strands of cord, or, in other words, 10 denotes where the whipping starts and 11 denotes where the operator or the one constructing the whipping leaves off. Referring to Figure 3, it will be noted that the start and finish are adjacent each other with the ends of the strand cut off flush.

Figure 2:
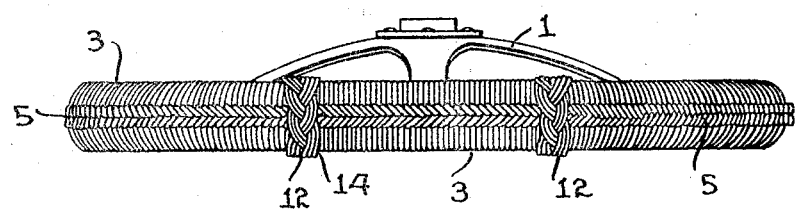
Figure 2 is an edge view.
Figure 6:
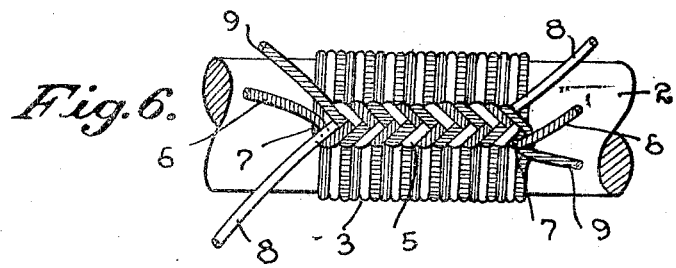
Figure 6 is an enlarged detail view of a portion of the whipping on the rim of the wheel, with the strands forming the whipping conventionally colored, showing the manner of disposing the strands about the rim of the wheel with the knots forming units of the bead or rib sufficiently opened up so as to illustrate the course or direction of the strands.

Referring to Figure 6, as well as to Figures 1 and 2, 12 denotes a Turk's head consisting of a plait, comprising three strands of cord. The ends of the cord forming the Turk's head may be tucked under certain of the strands of the plait, as shown at 14, so as to present a neat appearance and at the same time hide the start and finish of the Turk's head.

Referring to Figures 1 and 2, it will be understood that the steering wheel is provided with two Turk's heads, one of which covers the start and finish of the whipping, the correct term or name of which is coxcombing. In providing two Turk's heads on the rim of the wheel, it is possible for the chauffeur or operator to grasp the rim of the wheel between the two heads and maintain the wheel aligned in backing or turning. However, it is to be understood that only one Turk's head may be employed which also is used to cover the start and finish of the whipping. However, in using the one Turk's head, it may be positioned directly in front of the chauffeur or operator for the purpose of holding the steering wheel aligned sufficiently to facilitate the backing and turning.

It will be noted that the whipping is applied to a steering wheel rim which is endless, the whipping being arranged about the entirety of the rim and since the spider is fastened to the wheel rim subsequently to applying the whipping, no portion of the rim is exposed, thereby obviating the possibility of the hands of the chauffeur or operator coming in contact with the metal of the rim of the wheel or the cold surface of the rim which, in many instances, is constructed of wood. Furthermore, as the spider is placed upon the rim subsequently to applying the covering and since the spider is very simple in construction, there is very little metal with which the hand of the operator or chauffeur may engage.

The invention having been set forth, what is claimed is:

1. In a steering wheel, the combination with a steering wheel rim, of a covering therefor, consisting of a three strand cord whipping, said covering having a rib or bead adjacent the outer edge of the rim of the wheel.

2. In a steering wheel, the combination with the steering wheel rim, of a covering therefor consisting of a cord whipping, said covering having at its outer edge an endless rib adapted to so engage with the palm of the hand as to provide air spaces on the opposite sides of the rib.

3. A covering for a steering wheel rim consisting of a cord whipping provided with an outstanding radial rib adjacent the outer edge of the rim.

4. A covering for a steering wheel rim consisting of a cord whipping provided with an outstanding radial rib adjacent the outer edge of the rim, each whipping of cord being formed in a knot adjacent the outer edge of the rim, thereby constituting a unit in the formation of the rib.

5. A covering for a steering wheel rim consisting of a three strand cord whipping, each whipping of cord contacting with and abutting adjacent whippings to reinforce the covering, each whipping of cord also being formed in a knot adjacent the outer edge of the rim, thereby causing a rib to be formed on the outer edge of the rim of the wheel.

6. An endless unbroken covering for a steering wheel rim provided with a knotted rib adjacent the outer edge of the wheel rim for engagement with the palm of the hand to insure a firm grip and to provide air spaces on each side of the rib to obviate moisture in the palm.

7. A cord unbroken covering for a wheel rim provided with an outstanding rib adjacent the outer edge of the wheel rim.

8. An unbroken endless covering for a steering wheel rim consisting of three strands of cord whipped about the surface of the rim, said covering having a rib adjacent the outer edge of the rim, each whipping being formed into a knot constituting a unit in the rib, the starting and finish of a unit in the rib, the starting and finish of the three strands of cord being severed flush with the surface of the covering and tucked under certain of the whippings, and a Turk's head covering for the start and finish of the whippings of the covering.

9. An endless unbroken covering for a steering wheel rim provided with an outstanding rib adjacent the outer edge of the wheel rim, and a Turk's head band surrounding the covering at the rear side of the rim and constituting means for determining the position of the steering wheel.

10. A covering for a steering wheel rim consisting of three strands of unbroken cord whippings and provided with an outstanding rib adjacent the outer edge of the rim, and means consisting of Turk's heads at the rear part of the steering wheel rim by which the position of the wheel may be determined in backing and turning.

11. A method for applying a cord whipping consisting in passing one strand of cord in one direction about the rim of a steering wheel, skipping two other strands of cord, then forming a half turn knot, and similarly arranging the intervening whippings and interlacing the half turn knots of all of the various whippings.

12. A method of whipping several strands of cord about the surface of a steering wheel rim, consisting in forming one whipping, skipping two intervening whippings of other of said strands of cord which are similarly whipped, forming half turn knots, and interlacing the knots of the several whippings.

In testimony whereof he affixes his signature.

WALTER HUGHES.